United States Patent
Marik et al.

(10) Patent No.: US 9,970,673 B2
(45) Date of Patent: May 15, 2018

(54) MODEL IDENTIFICATION USING COMFORT NEUTRAL TESTING

(71) Applicant: Honeywell International Inc., Morristown, NJ (US)

(72) Inventors: Karel Marik, Revnice (CZ); Ondrej Holub, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 911 days.

(21) Appl. No.: 14/151,592

(22) Filed: Jan. 9, 2014

(65) Prior Publication Data
US 2015/0192315 A1 Jul. 9, 2015

(51) Int. Cl.
*F24F 11/00* (2018.01)
*G05B 13/04* (2006.01)

(52) U.S. Cl.
CPC ............ *F24F 11/006* (2013.01); *G05B 13/04* (2013.01); *F24F 2011/0091* (2013.01)

(58) Field of Classification Search
CPC .. F24F 11/006; F24F 2011/0091; G05B 13/04
See application file for complete search history.

(56) References Cited

U.S. PATENT DOCUMENTS 6,226,568 B1 * 5/2001 Tong ................ B05B 15/1207
454/52
2011/0276180 A1 * 11/2011 Seem .................. F25B 49/027
700/275

OTHER PUBLICATIONS

Soyguder, Servet et al., "Predicting of fan speed for energy saving in HVAC system based on adaptive network basd fuzzy inference system", 2008 Elsevier.*
Albertos et al., Multivariable control systems: an engineering approach, Springer-Verlag London Limited 2004.*

* cited by examiner

*Primary Examiner* — Carlos Ortiz Rodriguez
(74) *Attorney, Agent, or Firm* — Schwegman, Lundberg & Woessner, P.A.

(57) ABSTRACT

A method includes pairing manipulated variables and controlled variables in an HVAC system, perturbing a variable, controlling the HVAC system to maintain controlled variables in a comfort range, determining a state of the system, and deriving a model from the state of the system.

18 Claims, 3 Drawing Sheets

MODEL IDENTIFICATION USING COMFORT NEUTRAL TESTING

BACKGROUND

HVAC system control, and more specifically, multi-input-multi-output (multivariable, MIMO) control of HVAC plant has a significant advantage over traditional sets of single-input-single output (SISO) loops. MIMO control enables the setting of energy (cost) optimal values of manipulated variables (MVs). The drawback of MIMO control is that setup of the controller is significantly more difficult than setup of SISO loops. The setup requires setting relations between all manipulated variables and all controlled variables, and (ii) entering a cost objective function in a suitable form. A typical procedure for identification of these inputs in process industries (e.g. refinery) requires step-testing led by control engineer skilled in advanced control which is unacceptable in case of HVAC systems due to high costs and impact on building comfort during the testing.

SUMMARY

A method includes pairing manipulated variables and controlled variables in an HVAC system, perturbing a variable, controlling the HVAC system to maintain controlled variables in a comfort range, determining a state of the system, and deriving a model from the state of the system.

A machine readable storage device has instructions for execution by a processor of the machine to perform pairing manipulated variables and controlled variables in an HVAC system, perturbing a variable, controlling the HVAC system to maintain controlled variables in a comfort range, determining a state of the system, and deriving a model from the state of the system.

A device includes a processor, a memory device coupled to the processor and having a program stored thereon for execution by the processor to pair manipulated variables and controlled variables in an HVAC system, perturb a variable, control the HVAC system to maintain controlled variables in a comfort range, determine a state of the system, and derive a model from the state of the system.

DETAILED DESCRIPTION

Figure 1:
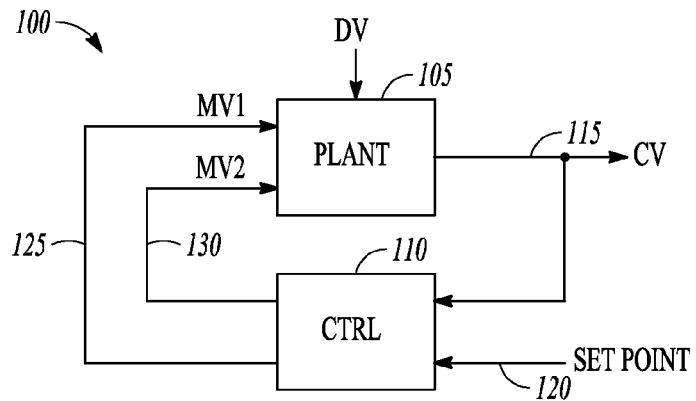
FIG. 1 is a block diagram of a plant having a multi-variable control system being tested without adversely disturbing a process to determine a control model according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Several terms utilizing "variable" are used and have the following definitions:

CV—controlled variables—these are the variables which quantify the performance or quality of the final product, which are also called output variables.

MV—manipulated variables—these input variables are adjusted dynamically to keep the controlled variables at their set-points.

DV—disturbance variables—these are also called "load" variables and represent input variables that can cause the controlled variables to deviate from their respective set points.

A method performs automatic identification of a steady state HVAC system model and cost objective model without violating a defined inhabitant comfort level. The comfort level may include one or more of temperature, humidity, and air quality, which may be kept within a comfortable range referred to as comfort conditions. Consequently, the method provides plug-and-play and comfort-safe setup of multivariable controller without the need of a control expert.

In various embodiments, a steady state system model CV=f(MVs, DVs) is identified by measuring multiple system steady-states. Typical heating, ventilation, and air conditioning (HVAC) plants have more manipulated variables (MVs) than controlled variables (CVs). This difference provides a degree of freedom available for comfort neutral step testing. In one embodiment, a method includes coupling an equal number of MVs and CVs to form a feedback controller. MVs with the highest expected MV-CV gains are selected for this purpose. Alternatively, the MV-CV pairs can be selected based on expert knowledge (e.g recommended SISO strategies).

Once the MV-CV pairs are selected, remaining MVs may be perturbed in order to explore the system behavior around the operating point. In one embodiment, perturbing an MV involves performing a step change in the MV. In further embodiments, perturbing may include a few changes made to one or more MVs in a systematic manner. Coupled MVs may then be changed by feedback control such that the CVs are unchanged. The steady state output of plant/system is unchanged and thus defined comfort is preserved.

New values of DVs, MVs and CVs form a new point which is recorded and used for system model estimation. The method may be repeated until the number of measured points is sufficient to identify steady state system model CV=f(MV, DV). A cost model, C=f(MV, DV), may be estimated in parallel with system model.

The method is independent of HVAC plant type and can be used for cost-optimal multivariable control of boiler plant, chiller plant, air handling unit, fan coil unit, occupied zone, etc. In example, multivariable controller of air handling unit would manipulate with following MVs (cooling valve position, heating valve position, mixing damper position, supply fan speed, return fan speed, recuperator speed, humidifier duty) in order to control CVs (supply air temperature, supply air humidity, supply air flow rate, supply air $CO_2$ content). A correctly setup controller may reset MV's values in a cost optimal way with respect to given disturbance variables (outside air temperature, supply hot & cold water temperature). Similar examples may be defined for other HVAC plants.

FIG. 1 is a block diagram of a system 100 including a plant 105 having a multi-variable control system 110 being tested without adversely disturbing a process to determine a control model according to an example embodiment. In this example, the plant 100 has one CV 115 that is fed back into the control system 110, along with a setpoint 120. The control system 110 provides values for two manipulated variables, MV1 at 125, and MV2 at 130, which are both fed back to control plant 100. In one embodiment, CV and MV1 are part of a SISO feedback loop utilizing proportional integral (PI) control via control system 110. MV2 may be a variable that may be disturbed, such as by use of rate limit steps. MV1 compensates for the MV2 changes without a significant variation in the controlled variable CV. Where CV is a temperature in the case of an HVAC system, the temperature remains within a determined comfortable range. Thus, the system is disturbed without adversely affecting the comfort of people in a structure covered by the HVAC system. A true steady state is not needed, as MV1 compensates for the DV effects.

When the system is disturbed, data regarding the variables is logged, and static models may be derived from measured or logged data. Look up tables (LUTs) may be used to determine models in one embodiment, with CV=f(MV,DV) and cost=f(MV, DV). In further embodiments, the model may include a regression model, a neural network model, or other model.

Figure 2:
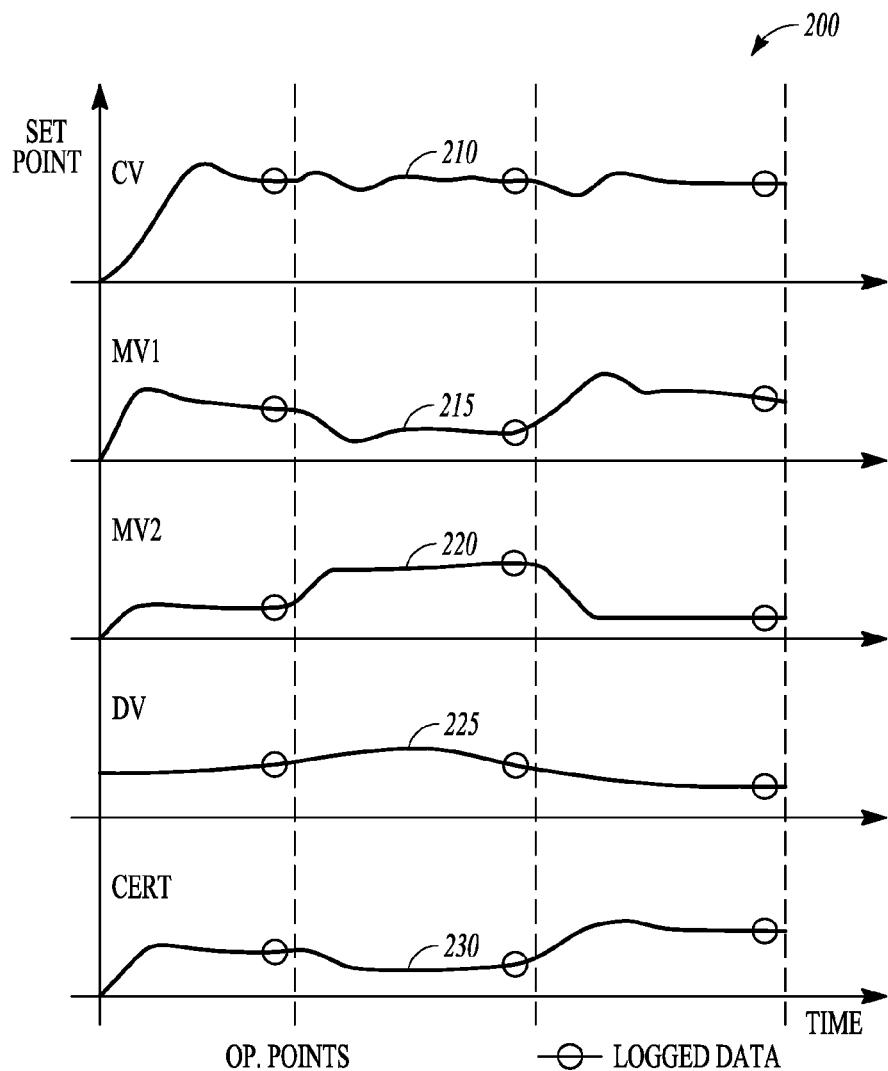
FIG. 2 is a graph indicating multiple variables including a disturbed variable according to an example embodiment.

FIG. 2 is a graph 200 indicating multiple variables including a disturbed variable according to an example embodiment. CV is represented by line 210, MV1 by line 215, MV2 by line 220, DV by line 225, and cost by line 230. MV2 is shown as being disturbed via a step function at a first vertical line past the axis. MV1 compensates for the MV2 changes as seen at 215, while CV 210 stays relatively constant. The logged data may then be used to help identify a static model corresponding to the changes in variables resulting from the disturbance. This process may be repeated many times for different magnitude changes of MV2, and further disturbances of other variables, all while keeping CV within a desired range, such as comfortable temperature zone for an HVAC system.

Figure 3:
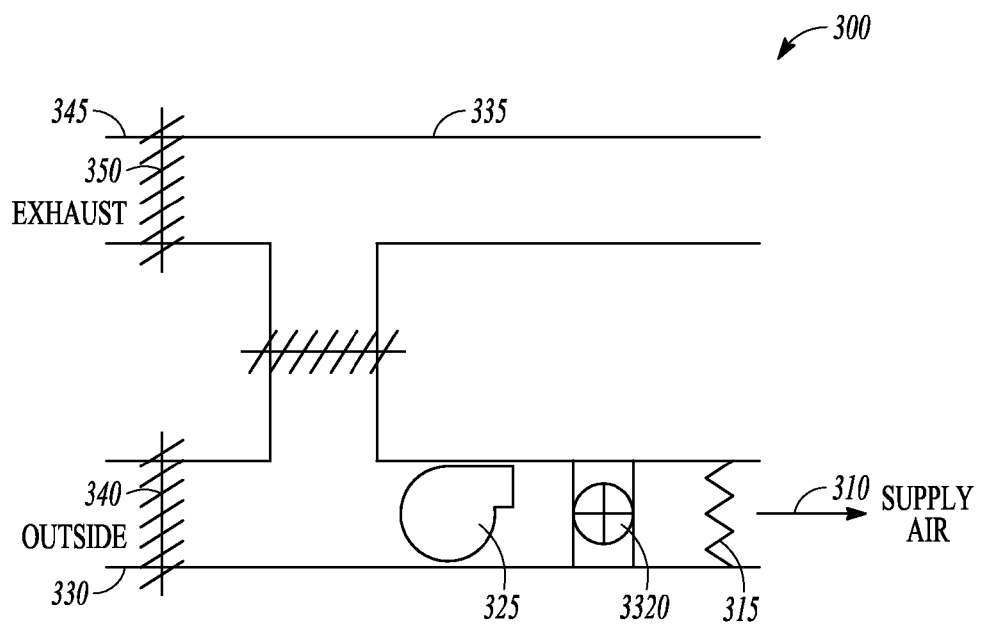
FIG. 3 is a block diagram illustrating a plant being controlled according to an example embodiment.

FIG. 3 is a block diagram illustrating an air handing unit 300 being controlled according to an example embodiment. Air handling unit 300 has several air ducts with various equipment to control the flow of air through the ducts. In one embodiment, system 300 provides supply air at 310 which has been humidified by a humidifier ($X_{HUM}$) 315, heated by a heating coil ($X_{HEAT}$) 320, and blown by a fan ($N_F$) 325. Air may be provided via an outside air ($I_{OA}$) duct 330 and return air ($T_{RA}$,$RH_{RA}$) duct 335. Airflow from the outside air duct 330 may be controlled by valve 340. Exhaust air duct 345 may be used to controllable exhaust return air via a valve 350. An economizer ($POS_{ECO}$) valve 355 may be positioned to control the amount of return air not exhausted provided to the fan 325, coil 320, and humidifier 315.

Air handling unit 300 is just one example of a controlled system whose model may be determined. In further embodiments, other systems, such as a boiler plant or chiller plant or zone may have a model determined in a similar manner.

Figure 4:
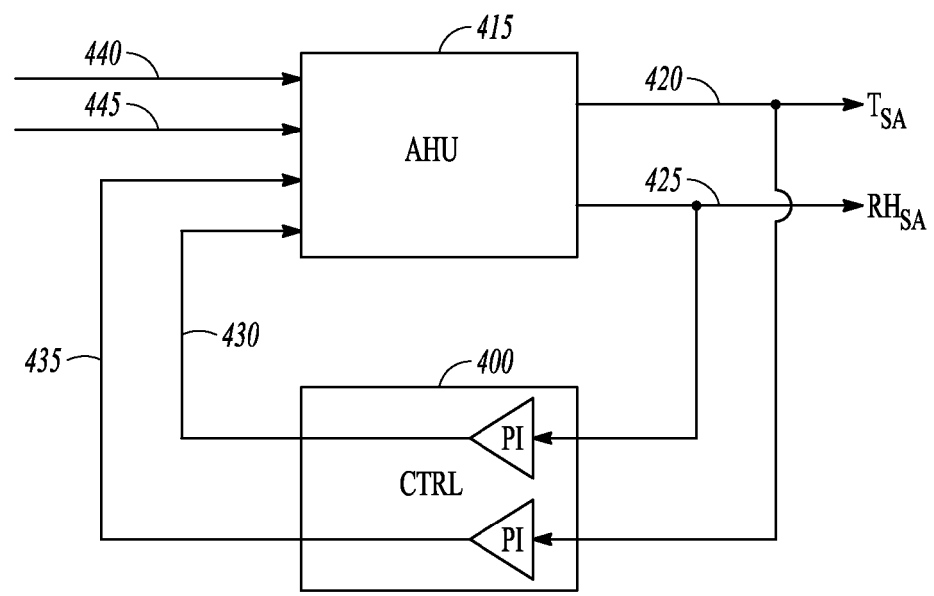
FIG. 4 is a block diagram illustrating control of an air handling unit according to an example embodiment.

FIG. 4 is a block diagram illustrating a controller 400 and air handling unit 410 according to an example embodiment. Air handling unit 410 is illustrated with several air inputs at 415 including $I_{OA}$, $TH_{OA}$, $T_{RA}$, and $RH_{RA}$. Outputs of the air handling unit 410 include $T_{SA}$ at 420 and $RH_{SA}$ at 425, both of which serve as inputs to controller 400, which utilizes PI control based on each input to provide $X_{HUM}$ and $X_{HEAT}$ inputs 430, 435 to air handling unit 415. Further inputs to air handling unit 415 include $POS_{ECO}$ at 440 and $N_F$ at 445.

In one embodiment, a heating valve is controlled by air supply air temperature and a humidifier is controlled by supply air humidity. Disturbances may be introduced via varying the fan speed within hygienic limits—either continuously or between fixed speeds, of via the economizer which may be switched on/off or otherwise varied by a few percent depending on construction. The heating coil and humidifier compensate for the disturbances and the artificially introduced variations. Static models are then built from logged MVs, DVs, CVs, and cost.

Figure 5:
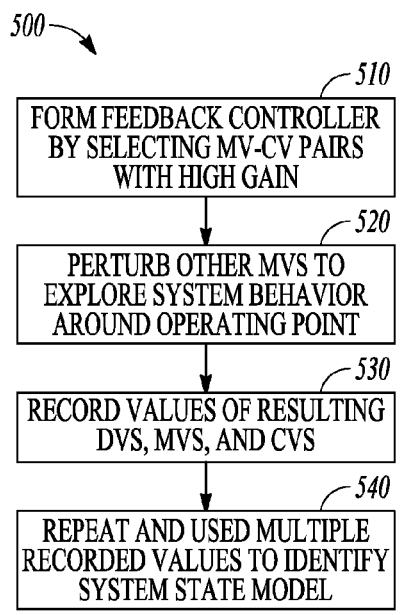
FIG. 5 is a flowchart illustrating a method of determining a control model by disturbing a process according to an example embodiment.

FIG. 5 is a flowchart illustrating a method 500 of determining a global control model by disturbing a process according to an example embodiment. At 510, an equal number of MVs and CVs are coupled to form a feedback controller. MVs with the highest expected MVCV gains may be selected for this purpose. Alternatively, the MV-CV pairs can be selected based on expert knowledge (e.g recommended SISO strategies).

Once the MV-CV pairs are selected, remaining MVs may be perturbed at 520 in order to explore the system behavior around the operating point. Coupled MVs may then be changed by feedback control such that the CVs are unchanged. The steady state output of plant/system is unchanged and thus defined comfort is preserved.

New values of DVs, MVs and CVs form a new point reflecting a state of the system, which is recorded at 530 and used for system model estimation. The method may be repeated at 540 until the number of measured points is sufficient to identify steady state system model CV=f(MV, DV). A cost model, C=f(MV, DV), may be estimated in parallel with system model.

Figure 6:
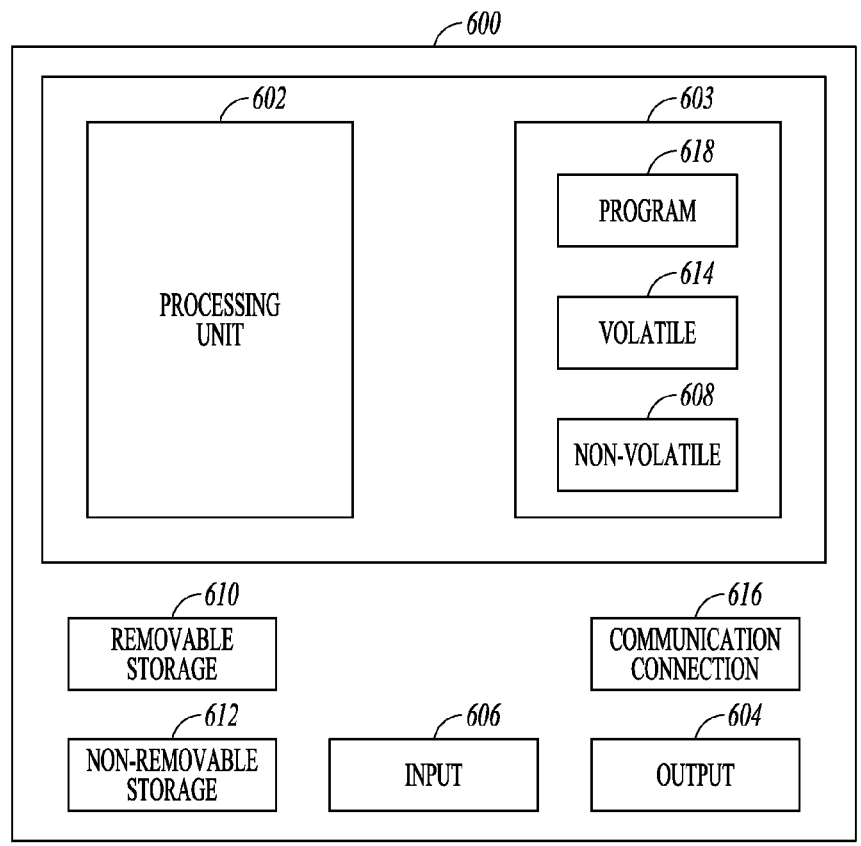
FIG. 6 is a block diagram of an example computer system for implementing one or more controllers and methods according to example embodiments.

FIG. 6 is a block diagram of an example computer system for implementing one or more controllers and methods according to example embodiments. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 600, may include a processing unit 602, memory 603, removable storage 610, and non-removable storage 612. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A method comprising:
pairing manipulated variables and controlled variables in an HVAC system;
perturbing a variable;
controlling the HVAC system to maintain controlled variables in a comfort range;
determining a state of the system; and
deriving a model from the state of the system.

2. The method of example 1 wherein controlling the HVAC system comprises performing proportional integral control on a pair of manipulated and controlled variables.

3. The method of any of examples 1-2 wherein variable is perturbed via a rate limit step.

4. The method of any of examples 1-3 wherein the determined state of the system is a steady state.

5. The method of example 4 wherein the model is derived from a look up table based on the logged data.

6. The method of example 4 and further comprising perturbing further variables to determine multiple states and a model of the system.

7. The method of any of examples 1-6 wherein the manipulated variables and controlled variables are part of an air handling unit of the HVAC system.

8. The method of example 7 wherein the perturbed variable is fan speed.

9. The method of example 8 wherein a heating coil and humidifier compensate for the perturbed fan speed.

10. A machine readable storage device having instructions for execution by a processor of the machine to perform:
pairing manipulated variables and controlled variables in an HVAC system;
perturbing a variable;
controlling the HVAC system to maintain controlled variables in a comfort range;
determining a state of the system; and
deriving a model from the state of the system.

11. The machine readable storage device of example 10 wherein controlling the HVAC system comprises performing proportional integral control on a pair of manipulated and controlled variables.

12. The machine readable storage device of any of examples 10-11 wherein the determined state of the system is a steady state represented by logged data and wherein the model is derived from a look up table based on the logged data.

13. The machine readable storage device of example 12 wherein the machine further performs perturbing further variables to determine multiple states and a model of the system.

14. The machine readable storage device of any of examples 10-13 wherein the manipulated variables and controlled variables are part of an air handling unit of the HVAC system.

15. The machine readable storage device of example 14 wherein the perturbed variable is fan speed.

16. The machine readable storage device of example 15 wherein a heating coil and humidifier compensate for the perturbed fan speed.

17. A device comprising:
a processor;
a memory device coupled to the processor and having a program stored thereon for execution by the processor to:
pair manipulated variables and controlled variables in an HVAC system;
perturb a variable;
control the HVAC system to maintain controlled variables in a comfort range;
determine a state of the system; and
derive a model from the state of the system.

18. The device of example 17 wherein the processor controls the HVAC system comprises performing proportional integral control on a pair of manipulated and controlled variables.

19. The device of example 18 wherein the determined state of the system is a steady state represented by logged data and wherein the model is derived from a look up table based on the logged data.

20. The device of example 19 wherein the processor further perturbs further variables to determine multiple states and a model of the system.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
pairing manipulated variables and controlled variables in an HVAC system;
perturbing an unpaired variable of the HVAC system;
controlling the HVAC system to compensate for the perturbance of the unpaired variable by adjusting one or more of the manipulated variables to maintain the controlled variables in a comfort range;

determining a state of the system based upon logged data relating to the manipulated, controlled, and perturbed variables;

repeating the perturbing, controlling, and determining a state of the system; and deriving a model from the determined states of the system, wherein the model is derived by measuring multiple steady states by perturbing different unpaired variables of the system while maintaining the controlled variables in a comfort range.

2. The method of claim 1 wherein controlling the HVAC system comprises performing proportional integral control on a pair of manipulated and controlled variables.

3. The method of claim 1 wherein the unpaired variable is perturbed via a rate limit step.

4. The method of claim 1 wherein the determined state of the system is a steady state, and unpaired manipulatable variables are disturbed individually to demonstrate the system behavior around the steady state operating point to inform derivation of the model.

5. The method of claim 4 wherein the model is derived from a look up table based on the logged data.

6. The method of claim 1 wherein the manipulated variables and controlled variables are part of an air handling unit of the HVAC system.

7. The method of claim 6 wherein the perturbed variable is fan speed.

8. The method of claim 7 wherein a heating coil and humidifier compensate for the perturbed fan speed.

9. The method of claim 1 wherein the manipulated variables and controlled variables are part of an air handling unit of the HVAC system, the perturbed variable is fan speed, and a heating coil and humidifier compensate for the perturbed fan speed.

10. A machine readable storage device having instructions for execution by a processor of the machine to perform:

pairing manipulated variables and controlled variables in an HVAC system;

perturbing an unpaired variable of the HVAC system;

controlling the HVAC system to compensate for the perturbance of the unpaired variable by adjusting one or more of the manipulated variables to maintain the controlled variables in a comfort range;

determining a state of the system based upon logged data relating to the manipulated, controlled, and perturbed variables;

repeating the perturbing, controlling, and determining a state of the system; and deriving a model from the determined states of the system, wherein the model is derived by measuring multiple steady states by perturbing different unpaired variables of the system while maintaining the controlled variables in a comfort range.

11. The machine readable storage device of claim 10 wherein controlling the HVAC system comprises performing proportional integral control on a pair of manipulated and controlled variables.

12. The machine readable storage device of claim 10 wherein the determined state of the system is a steady state represented by the logged data and wherein the model is derived from a look up table based on the logged data.

13. The machine readable storage device of claim 10 wherein the manipulated variables and controlled variables are part of an air handling unit of the HVAC system.

14. The machine readable storage device of claim 13 wherein the perturbed variable is fan speed.

15. The machine readable storage device of claim 14 wherein a heating coil and humidifier compensate for the perturbed fan speed.

16. A device comprising:

a processor;

a memory device coupled to the processor and having a program stored thereon for execution by the processor to:

pair manipulated variables and controlled variables in an HVAC system;

perturb an unpaired variable of the HVAC system;

control the HVAC system to compensate for the perturbance of the unpaired variable by adjusting one or more of the manipulated variables to maintain the controlled variables in a comfort range;

determine a state of the system based upon logged data relating to the manipulated, controlled, and perturbed variables;

repeating the perturbing, controlling, and determining a state of the system; and derive a model from the determined states of the system, wherein the model is derived by measuring multiple steady states by perturbing different unpaired variables of the system while maintaining the controlled variables in a comfort range.

17. The device of claim 16 wherein the processor controls the HVAC system comprises performing proportional integral control on a pair of manipulated and controlled variables.

18. The device of claim 17 wherein the determined state of the system is a steady state represented by logged data and wherein the model is derived from a look up table based on the logged data.

* * * * *